(12) United States Patent
Graue

(10) Patent No.: US 8,763,710 B2
(45) Date of Patent: Jul. 1, 2014

(54) METHOD FOR INTEGRATED ENHANCED OIL RECOVERY FROM HETEROGENEOUS RESERVOIRS

(75) Inventor: Arne Graue, Godvik (NO)

(73) Assignee: Bergen Teknologioverforing AS, Bergen (NO)

( * ) Notice: Subject to any disclaimer, the term of this patent is extended or adjusted under 35 U.S.C. 154(b) by 387 days.

(21) Appl. No.: 13/384,269

(22) PCT Filed: Jul. 21, 2010

(86) PCT No.: PCT/EP2010/004474
§ 371 (c)(1),
(2), (4) Date: Feb. 13, 2012

(87) PCT Pub. No.: WO2011/009610
PCT Pub. Date: Jan. 27, 2011

(65) Prior Publication Data
US 2012/0125616 A1    May 24, 2012

(30) Foreign Application Priority Data
Jul. 22, 2009    (EP) .................................... 09009511

(51) Int. Cl.
*E21B 43/16* (2006.01)
(52) U.S. Cl.
USPC .......................... 166/402; 166/401; 166/270.1
(58) Field of Classification Search
USPC .......................... 166/401, 402, 403, 270.1, 300
See application file for complete search history.

(56) References Cited

U.S. PATENT DOCUMENTS

| 3,342,256 A | 9/1967 | Bernard et al. |
| 3,882,938 A | 5/1975 | Bernard |

(Continued)

FOREIGN PATENT DOCUMENTS

| DE | 3045426 A1 | 7/1982 |
| EP | 0212671 A2 | 3/1987 |
| WO | 2009060177 A1 | 5/2009 |

OTHER PUBLICATIONS

Aspenes et al., "Fluid Flow in Fractures Visualized by MRI During Water-floods at Various Wettability Conditions—Emphasis on Fracture Width and Flow Rate", SPE Annual Technical Conference, Sep. 29, 2002-Oct. 2, 2002, San Antonio, TX.

(Continued)

*Primary Examiner* — Kenneth L Thompson
*Assistant Examiner* — Catherine Loikith
(74) *Attorney, Agent, or Firm* — Caesar, Rivise, Bernstein, Cohen & Pokotilow, Ltd.

(57) ABSTRACT

A method of recovering oil from a heterogeneous reservoir, comprising a plurality of permeable porous blocks of rock whose pores contain oil and which form interfaces with regions between the blocks, e.g. fractures, having a higher permeability than the blocks. Treating the interfaces such that the wettability of the surfaces of the blocks is in a predetermined wettability range, then reducing the permeability in the highly permeable regions, and finally flooding the reservoir by injecting a chase fluid into the reservoir. With the present method, water phase bridges are established between adjacent blocks in the reservoir thus allowing a transmission of injection pressure for viscous displacement from one block to the next across the reservoir. A method for long-time storage of $CO_2$ by using $CO_2$ as chase fluid or foaming gas according to the present method for oil recovery from heterogeneous reservoirs.

18 Claims, 2 Drawing Sheets

(56) References Cited

U.S. PATENT DOCUMENTS

| | | | |
|---|---|---|---|
| 4,427,067 A | | 1/1984 | Stone |
| 4,706,752 A | | 11/1987 | Holm |
| 4,836,283 A | * | 6/1989 | Loza et al. .............. 166/279 |
| 4,842,065 A | | 6/1989 | McClure |
| 5,042,580 A | | 8/1991 | Cullick et al. |
| 5,074,358 A | | 12/1991 | Rendall et al. |
| 5,247,993 A | | 9/1993 | Sarem et al. |
| 5,351,757 A | | 10/1994 | Chou et al. |
| 2002/0195246 A1 | | 12/2002 | Davidson |

OTHER PUBLICATIONS

Aspenes et al., "Wetting Phase Bridges Establish Capillary Continuity Across Open Fractures and Increase Oil Recovery in Mixed-Wet Fractured Chalk", Springer Science+Business Media B.V., Transp. Porous Med (2007).

Bertin et al., "Foam Flow in Heterogeneous Porous Media: Effect of Cross Flow", SPE Journal, vol. 4, No. 2, Society of Petroleum Engineers, (1999).

Farajzadeh et al., "Foam-Oil Interaction in Porous Media: Implications for Foam Assisted Enhanced Oil Recovery", SPE 154197, Society of Petroleum Engineers, pp. 1-20 (2012).

Fjelde et al., "Oil Recovery from Matrix during CO2-Foam Flooding of Fractured Carbonate Oil Reservoirs", SPE 113880, Society of Petroleum Engineers, pp. 1-9 (2008).

Graue et al., "MRI Tomography of Saturation Development in Fractures During Waterfloods at Various Wettability Conditions", SPE 71506, Society of Petroleum Engineers, pp. 1-18 (2001).

Kim et al., "Steady-State Flow Behavior of CO2 Foam", SPE Journal, Society of Petroleum Engineers, pp. 405-415 (2005).

Kovscek et al., "Foam flow through a transparent rough-walled rock fracture", Journal of Petroleum Science and Engineering, vol. 13, Elsevier Science B.V., pp. 75-86 (1995).

Li et al., "Foam Mobility Control for Surfactant Enhanced Oil Recovery", SPE Journal, Society of Petroleum Engineers, pp. 934-948 (2010).

Li et al., "Wettability Alteration and Foam Mobility Control in a Layered 2-D Heterogeneous System", SPE 141462, Society of Petroleum Engineers, pp. 1-17 (2011).

Tanzil et al., "Mobility of Foam in Heterogeneous Media: Flow Parallel and Perpendicular to Stratification", SPE Journal, Society of Petroleum Engineers, pp. 203-212 (2002).

International Search Report for PCT/EP2010/004474 dated Aug. 26, 2010.

* cited by examiner

METHOD FOR INTEGRATED ENHANCED OIL RECOVERY FROM HETEROGENEOUS RESERVOIRS

TECHNICAL FIELD

The invention relates to a method of enhanced oil recovery from a geological reservoir formation having a heterogeneous permeability distribution and to a method of $CO_2$ long-time storage.

TECHNICAL BACKGROUND OF THE INVENTION

A considerable amount of oil present in geological formations is stored in heterogeneous reservoirs having a heterogeneous permeability distribution. Such heterogeneous reservoirs can be fractured reservoirs where oil is contained in porous rock blocks, also referred to as reservoir matrices, which are separated by a network of fractures. The permeability of fractures can exceed the permeability of the rocks matrices by several orders of magnitude. In addition the permeability of the porous rocks can vary locally, e.g. due to different sizes of pores and pore throats. Rock regions having large pore throats usually have a higher permeability compared to the regions having small pore throats. Fractured reservoirs can be characterized by the parameters of wettability of the rock matrices, fracture apertures, and fracture configuration.

Conventional methods for oil recovery from geological reservoirs include displacement methods by water flooding or gas flooding. These methods have in common that a chase fluid, which can for example be water, a solvent or a gas, is injected into a reservoir through an injection well in order to displace oil from the reservoir, and drive the oil towards distant production wells. Depending on the choice of the chase fluid, its viscosity, temperature conditions, and pressure exerted onto the chase fluid, the displacement mechanism can either be miscible displacement, immiscible displacement, also referred to as viscous displacement or diffusion.

Generally, when a chase fluid is injected into heterogeneous reservoirs under pressure, it will preferably propagate through the reservoir along the path of highest permeability. This is especially the case for chase fluids having a low viscosity compared to the oil to be recovered, such as gas. Therefore, viscous chase fluids are preferred for displacement methods under pressure. Nevertheless, in a fractured reservoir or heterogeneous reservoirs in general, fractures and highly permeable streaks will form main passages for injected fluids. This leads to a reduced efficiency in displacement recovery from heterogeneous reservoirs.

For increasing the efficiency of displacement recovery from heterogeneous reservoirs, it is known to plug the highly permeable streaks, such that the chase fluid will enter into the less permeable rock blocks in order to displace oil from the blocks. Known methods for plugging of fractures and highly permeable streaks include injection of chemicals, such as disclosed for example in U.S. Pat. No. 3,882,938, or generation of foam in the permeable streaks, the latter of which especially reduces the mobility of gas as a chase fluid. Consequently, the efficiency of $CO_2$-gas flooding can be increased by previous generation of $CO_2$ containing foams in the reservoir.

Application of pressure on the chase fluid in heterogeneous reservoirs suffers from the additional drawback, that when the chase fluid and oil propagates through the rock matrices under pressure, usually the differential driving pressure can not be transmitted from one block to the next adjacent block across a fracture due to lack of capillary contact. This leads to a propagation of the chase fluid preferentially in the fractures, or depending on the wettability conditions of the matrices, on a block by block basis, relying on spontaneous imbibition of the wetting phase for the oil recovery from the matrix blocks and thus a loss of differential pressure across the blocks, causing low oil recovery.

OBJECTIVE OF THE INVENTION

In view of above mentioned problems, it is therefore an objective of the invention, to provide a method for enhanced oil recovery from heterogeneous reservoirs, according to which the efficiency of oil recovery can be increased.

SUMMARY OF THE INVENTION

The objective of the invention is achieved with the method according to independent claim 1. Further aspects and preferred embodiments of the invention are denoted in the dependent claims.

According to the inventive method, oil is recovered from a geological reservoir formation having a heterogeneous permeability distribution, comprising a plurality of permeable porous blocks, e. g. of rock, whose pores contain oil and which form interfaces with regions, e.g. fractures, between the blocks having a higher permeability than the blocks. The method comprises the steps of treating the interfaces such that the wettability of the surfaces of the blocks is in a predetermined wettability range at the interfaces between the blocks and regions of high permeability, then reducing the permeability in the regions of higher permeability, and finally flooding the reservoir by injecting a chase fluid into the reservoir for displacement recovery of oil.

With the inventive method, water phase bridges are established between adjacent blocks in the reservoir, thus allowing a transmission of injection pressure for viscous displacement, in particular from one block to the next, across the reservoir. A continuous fluid flow between the blocks across the reservoir becomes possible. Therefore, the efficiency of displacement recovery from heterogeneous reservoirs is increased.

The expression "water phase bridges" as used herein refers to spaced apart water structures, which span across fractures between adjacent blocks, as exemplified in the embodiment of FIG. 3.

The geological reservoir formation having a heterogeneous permeability distribution includes a fractured reservoir and/or a non-fractured reservoir e.g. consisting of porous rock matrices with locally varying pore sizes or heterogeneous composition. Reservoir heterogeneities can also be comprised of voids in rock formations which can e.g. be filled with sand. In the following, all these reservoirs will generally be called "heterogeneous reservoirs". Porous rock matrices can consist for example of chalk or other carbonates like dolomite and limestone or of classic deposits like sandstone and combinations thereof. Oil-bearing geological reservoirs usually contain oil and water contained in pores of the porous rock matrices. Within this application, the rock matrices or regions of rock matrices containing oil or oil and water and having a low permeability are referred to as blocks. These blocks form interfaces with regions having a higher permeability such as for example fractures. The fracture apertures, i.e. the width of the fractures between adjacent blocks can, for example, be in the range from several micrometers up to about 500 µm. Typically, the fracture aperture varies within a range of 20 μm to 200 μm. For some reservoirs variations from 300 μm up to several mm-range or more within a reservoir are possible.

Depending on the material of the rock matrices, the blocks can have defined wettability properties, such as for example various degrees of water-wet (hydrophilic) or oil-wet (hydrophobic). It is, however, also possible that the wettability of the matrices varies locally within a reservoir.

In a first step of the method according to the invention, the interfaces between the porous blocks and the fractures, or more generally the regions of higher permeability, are treated such that the wettability of the surfaces of the blocks is in a predetermined wettability range at the interfaces between the blocks and the regions of high permeability. Within this application, the term block "surfaces" also denotes internal surfaces of the blocks forming interfaces with highly permeable regions.

A preferred, predetermined wettability range is slightly to moderately water-wet, for example exhibiting an Amott water index $I_w$ not smaller than $I_w=0$, preferably not smaller than $I_w=0.1$ and being not larger than $I_w=0.9$, preferably not larger than $I_w=0.8$ and even more preferably not larger than $I_w=0.7$. This predetermined wettability range is referred to as the moderately water-wet range within this application. An Amott water index of $I_w=1$ denotes strongly water-wet conditions.

The wettability of the surfaces being in the predetermined wettability range has the effect that during subsequent flooding of the reservoir, the formation of water phase bridges between adjacent blocks is enhanced, in particular, the water phase bridges between adjacent blocks are established or enhanced. After reducing fracture permeability and then by flooding the reservoir in the third step, a chase fluid is injected into the reservoir and enters into the block matrices either by spontaneous imbibition or by application of pressure. Consequently, oil or oil and water present in the pores of the blocks will be displaced from the blocks. As the chase fluid propagates into a block, water will begin to form droplets on the exit surface of the block, i.e. the surface facing away from the injection well in the downstream flow direction. The water forming droplets can be water displaced from the rock pores by the chase fluid or injected water (in case of water flooding) or both. When the wettability of the exit surfaces is in the predetermined range, water droplets begin to form and subsequently water phase bridges will be established between adjacent blocks; before the saturation of chase fluid reaches the endpoint spontaneous imbibition saturation, at which time the capillary pressure becomes zero. The formation and cross-sectional area of water bridges are determined by the wettability of the surfaces, the interfacial tension between the chase fluid and the oil and the applied viscous pressure.

Once water bridges have formed between adjacent blocks, a transmission of pressure between the blocks across the highly permeable regions becomes possible. By the formation of water bridges, capillary continuity is established between adjacent blocks and transmitted across the reservoir. Capillary continuity between adjacent blocks preserves a hydraulic continuum in the water phase over fractures and transfers the injection pressure necessary for viscous oil recovery. Thereby fluid flow between the blocks can be established not only close to the injection well but also deeply inside the reservoir, thus leading to an increased efficiency of oil recovery. Consequently, the method according to the invention allows for an efficient use of viscous displacement recovery of oil from heterogeneous reservoirs. Therefore, the method according to the invention yields an additional amount of recovered oil of up to 5-20% for water-wet reservoirs and even more for oil-wet reservoirs, highly depending on the degree of wetting and the type of chase fluid applied; when compared to conventional oil recovery methods from heterogeneous reservoirs.

In contrast, according to conventional methods, if the wettability of the surfaces is not in the predetermined range but is for example strongly water-wet, such as e.g. exhibiting an Amott water Index of $I_w=1$, no water bridges would form. Oil production would be determined by spontaneous brine (chase fluid) imbibition only. In this case, injection pressure necessary for viscous displacement could not be transmitted in the reservoir. According to the inventive method, however, due to the surface wettability being in the predetermined range, water bridges will form spanning across the fractures thereby allowing a transmission of injection pressure and a continuous fluid flow through the reservoir.

At oil-wet conditions no brine imbibition would take place and the usual quite inexpensive water flooding will be inefficient for oil recovery. However, applying the inventive method, by altering the wettability of the surface of the fractures, requiring only a fraction of chemical agents compared to altering the wettability of all of the matrices, waterflooding would be efficient by first altering the fracture surface wettability to prepare for wetting phase bridges, then reducing the fracture permeability and finally inject water, or another chase fluid, to be diverted into the matrices and viscously displace the oil, taking advantage of the wetting phase bridges for fluid flow capabilities and pressure transmission.

Preferably, the step of treating the interfaces such that the wettability of the block surfaces is in a predetermined wettability range is achieved by injecting a wettability altering agent into the reservoir. Such wettability altering agent can for example be a microemulsion containing surfactants like sulfonates and/or sulfates. However, other known wettability altering substances can be used alternatively. Preferably, the surfactant comprises at least one of an amphoteric surfactant, which advantageously can be used to modify wettability and impart brine tolerance to the formulation, alphaolefinsulfonate (AOS), preferably having 12 to 16 carbon atoms, e. g. AOS having a linear chain of 14 carbon atoms, an internal olefin sulfonate, preferably having 15 to 18 carbon atoms, and an anionic surfactant, which advantageously produces foam and is stable at high temperatures.

Preferably, the at least one surfactant is selected such it reflects the right polarity of the mineral surface (negative charge for quartz and positive surface charge for limestones and chalk), matches the pH value and causes surfactant absorption on the rock at high temperature and high pressures.

Preferably, the wettability altering agent includes a combination of multiple surfactants which include a first surfactant, which produces a stable foam in a seawater-based brine, a second surfactant, which changes the wettability of the surfaces of the blocks to make them water-wet, and a third surfactant, preferably an anionic surfactant, which resists foam breaking when contacting oil. Preferably the first to third surfactants are selected such that they operate at temperatures above 80° C.

Advantageously, the second surfactant that alters the wettability has the capability to absorb on the rock and this will usually cause precipitation of some minerals, like calcite and/or magnesium. This may plug the permeable rock. To change wettability it is also possible for the surfactants to temporarily absorb on the rock and then desorb; like typically it happens with detergents.

Preferably, the wettability altering agent is injected into the reservoir from an injection well as known from conventional displacement recovery methods. A treatment of the whole reservoir with chemicals such as surfactants would be expensive and is therefore generally regarded as non-economic. According to a preferred embodiment of the invention, however, only the surfaces of the blocks are treated with the wettability altering agent. It is therefore sufficient to inject wettability altering agent into the fractures or the regions of high permeability. Since the agent will preferably enter the highly permeable regions of the reservoir before it will enter into the blocks, the amount of wettability altering agent necessary for treating the interfaces is limited to the volume of the fractures or regions of high permeability. Preferably, the wettability altering agent propagates in the highly permeable regions by diffusion or by displacement. The injection can be stopped when wettability altering agent has reached the interfaces in the highly permeable regions. The amount of wettability altering agent needed for treating the interfaces can be estimated on basis of empiric data about the relative fracture volume and inner surface of the reservoir. A typical value of the volume ratio of fractures and blocks is less than 1%, depending on the fracture intensity even fractions of a percent for some reservoirs. Thus, the amount of wettability altering agent and corresponding costs can be kept low.

Preferably only the surfaces of the blocks are subjected to wettability alteration. The amount of oil which can be recovered from a block by spontaneous imbibition is limited by the amount of chase fluid which can be capillary sucked into the blocks. Imbibition of a polar chase fluid, such as water, will be at maximum, if the block matrix is strongly water-wet. On the other hand, oil-wet rock does not imbibe water and in general an oil-wet reservoir is thus not a good candidate for waterflooding with conventional methods.

Depending on the wettability properties of the reservoir before treatment, the first step may lead to an alteration of the wettability of the surfaces from oil-wet to moderately water-wet or from strongly water-wet to moderately water-wet, such as in the above mentioned range. When the wettability is altered from oil-wet to moderately water wet, this can lead to additional imbibition of chase fluid, thus resulting in an increased amount of recovered oil. In some reservoirs, the wettability may also be in the predetermined range by nature. In this case, no alteration of the wettability of the surfaces is necessary, and the first step only serves to ensure that the wettability indeed is in the predetermined range.

In a second step of the method according to the invention, the permeability in highly permeable regions such as fractures or rock regions having larger pores is reduced. This leads to a plugging of these regions, such that fluids injected into the reservoir afterwards will preferably enter the rock blocks instead of the fractures.

Reducing the permeability of the regions of high permeability can preferably be achieved by injecting a permeability reducing agent into the reservoir. Such permeability reducing agent can for example be one of a polymer, a gel, or sodium silicate. Certain bacteria, both anaerobic and aerobic, for example sulfate reducing bacteria, are also known to have a permeability reducing effect and may be used. According to a preferred variant of the invention, reducing the permeability is achieved by generating foam in the highly permeable regions. Foam can be generated by first injecting a foaming agent, such as for example surfactants like sulfonates or sulfates into the regions of high permeability, and subsequently injecting a foaming gas leading to a formation of foam in these regions.

Alternatively, pregenerated foam made of a foaming agent and a foaming gas can be injected into the reservoir, for providing the foam in the regions having a high permeability. This is preferably obtained by flushing a surfactant and a gas, e. g. nitrogen or $CO_2$, through a piece of porous material, like sandstone, to generate the foam in the porous material, before injecting it into the fractured rock. Using the pregenerated foam may have advantages if void volume of the fractures would not provide sufficient turbulence or mixing of the gas and the surfactant. Experiments have been made by the inventor showing the in-situ foam generation yielded less oil recovery compared with pre-generated foam allowing to produce 80% of the oil in place.

Foam is known to considerably reduce the permeability in these regions. In particular, foam can substantially reduce the gas mobility in these regions leading to a reduced permeability for gas. A suitable foaming gas can be for example air, $CO_2$ or nitrogen.

In a particular preferred embodiment of the invention, the permeability reducing agent or the foaming agent is injected into the reservoir together with the wettability altering agent as the first step. This leads to the advantage that the amount of agent to be injected into reservoir can be reduced. Consequently, therefore, expenditure of time and costs can be kept low. For example, a microemulsion containing surfactants could serve for both, as wettability altering agent and as foaming agent.

After the permeability has been reduced in the highly permeable regions, chase fluid is injected into the reservoir as a third step of the method according to the invention. Since the highly permeable streaks are plugged, the chase fluid will enter into the porous blocks driven by wettability properties of the blocks and/or by pressure. By entering the blocks, the chase fluid will displace oil or oil and water present in the pores of the blocks. Preferably, the chase fluid is injected into the reservoir under pressure for viscous displacement. The pressure applied to the chase fluid for viscous displacement can for example be in the range of 10 to 100 bar above the pressure in the pores which is usually in the range of 300 to 600 bar.

The chase fluid can be for example water, liquid $CO_2$, or a gas, such as $CO_2$-gas, nitrogen or air. As a further example supercritical $CO_2$ can be the chase fluid. With an injection of $CO_2$ into the reservoir, oil is preferably displaced by miscible displacement, while water and/or $CO_2$, or in alternating sequences (WAG, water alternating gas), as a chase fluid is preferred for viscous displacement. Miscibility of $CO_2$ with oil in the reservoir depends on temperature and pressure conditions. Therefore $CO_2$ can be used for both, miscible or viscous displacement depending on pressure and temperature conditions in the reservoir. In a preferred embodiment of the invention, the same gas is used as chase fluid and as a foaming gas. The use of the same gas as a foaming gas and as chase fluid saves time and costs because the gas volume to be injected into the reservoir can be reduced.

Injection of $CO_2$-gas as a chase fluid and as foaming gas is particularly preferred. Long term experience has confirmed that $CO_2$-gas injected into a reservoir will remain therein. Consequently, the method can also serve as a method for long-time storage of $CO_2$, which is an independent subject-matter of the invention.

The method according to the invention comprises three steps. According to an especially preferred variant of the invention, wettability altering agent is injected into the reservoir together with a foaming agent as a first step. In the second and third steps a gas (preferably $CO_2$-gas) is injected as a foaming gas and as a chase fluid. Consequently, the third step of displacement and the second step of reducing the permeability by foaming can be combined. Foaming can be maintained throughout the displacement of oil. If necessary, further foaming agent can also be introduced into the reservoir during the flooding step, for example as a co-injection. Consequently, by a smart choice of substances, the three step method according to the invention can be performed in two steps.

As a further advantage, the inventive method can be conducted with available technical devices, in particular with a combination of at least one injection well arranged for introducing the wettability altering and permeability reducing agent(s) and the chase fluid and at least one production well arranged for recovering the reservoir oil. All available well patterns can be used for arranging the injection and production wells. A plurality of injection and/or production wells can also be used.

BRIEF DESCRIPTION OF THE DRAWINGS

Further aspects of the invention will become apparent by the preferred embodiment of the invention illustrated in the attached drawings, which schematically show in:

As shown in FIG. 1, the fractured reservoir 10 comprises porous blocks 11 containing oil and water and having a low permeability. The blocks 11 are separated from each other by a network of fractures 13 having a higher permeability. The widths of the fractures are for example about 200 μm. As a first step, a wettability altering agent 15 is injected into the reservoir 10 from an injection well (not shown). Due to the higher permeability in the fractures 13, the wettability altering agent 15 will preferably first enter into the fractures 13. The wettability altering agent 15 is for example a microemulsion containing surfactants. When the wettability altering agent 15 contacts the surfaces of the rock blocks at the interfaces 12 between the rock blocks 11 and the fractures 13, the wettability of the surfaces of the rock blocks 11 will be altered to be in a predetermined range. Since wettability alteration shall be achieved only at the surfaces 12 of the rock blocks 11, the amount of wettability altering agent 15 can be kept low.

Figure 1:
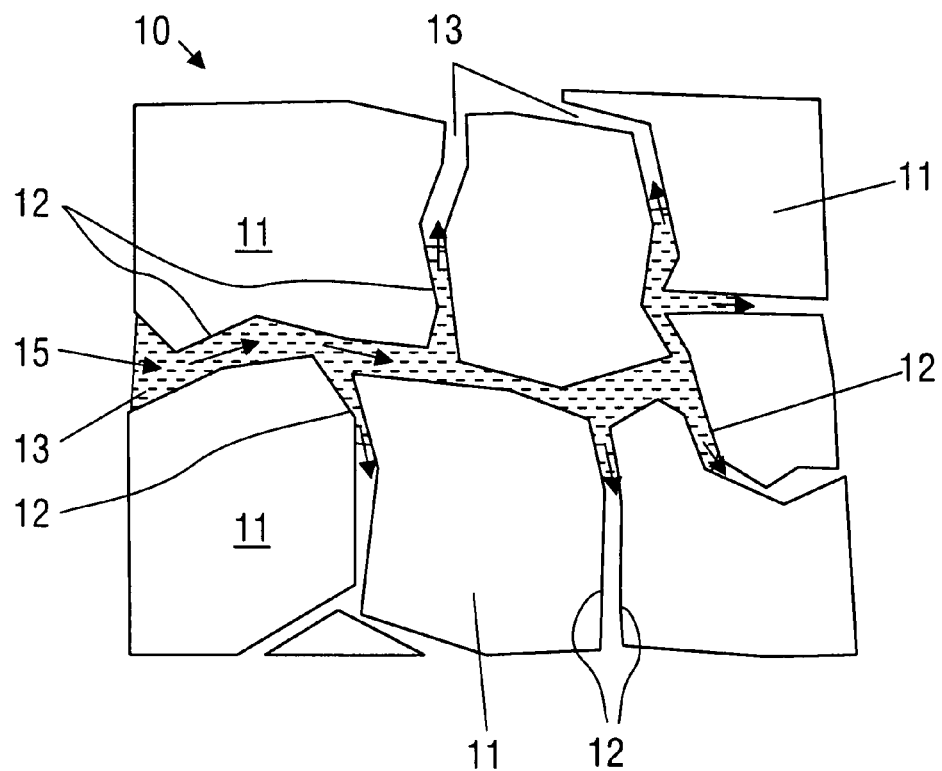
FIG. 1: a fractured reservoir in which wettability altering agent is injected in the first step of the method according to the invention.

By injecting the wettability altering agent 15 into the fractures 13 of the reservoir 10, the surfaces 12 of strongly water-wet blocks 11 can be altered to be moderately water-wet.

Figure 2:
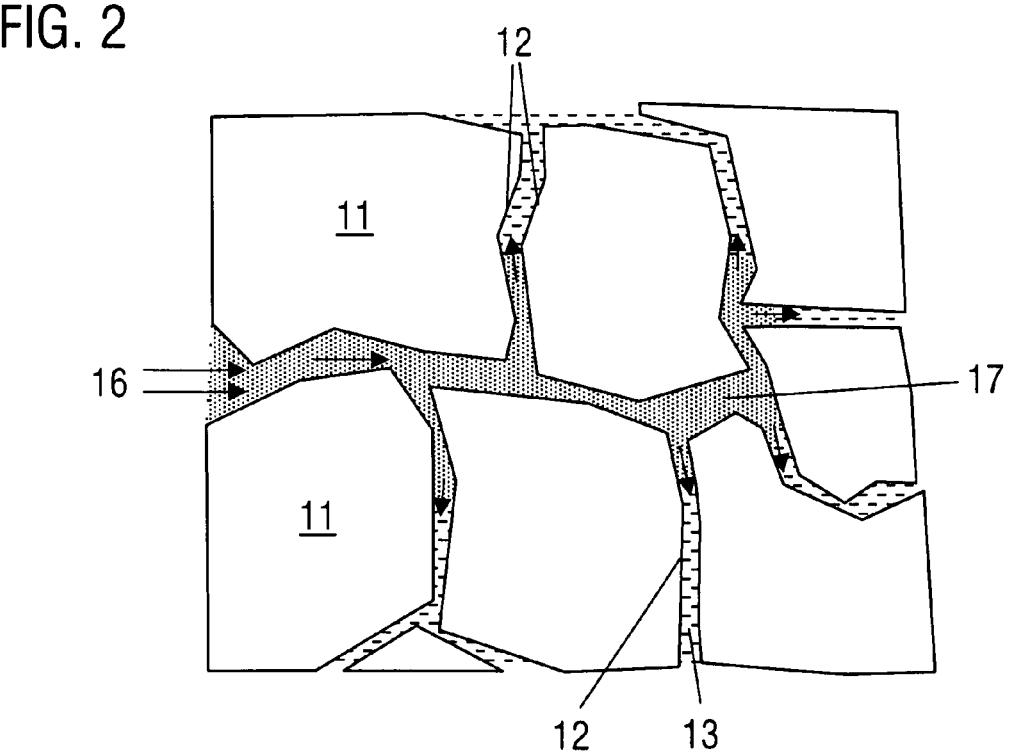
FIG. 2: the fractured reservoir of FIG. 1, in which a foaming gas is injected as the second step.

Preferably, a foaming agent is injected into the fractures of the reservoir together with the wettability altering agent 15. In a second step, shown in FIG. 2, a foaming gas 16 is injected from the injection well into the reservoir 10. Due to the foaming agent introduced in the first step, foam 17 will be generated in the fractures 13 as the foaming gas propagates through the reservoir 10. The formation of foam 17 in the fractures 13 will lead to a reduced permeability in the fractures 13. Thus, the foaming agent injected in the first step together with the foaming gas injected in the second step, act as a permeability reducing agent for plugging the highly permeable fractures 13.

Figure 3:
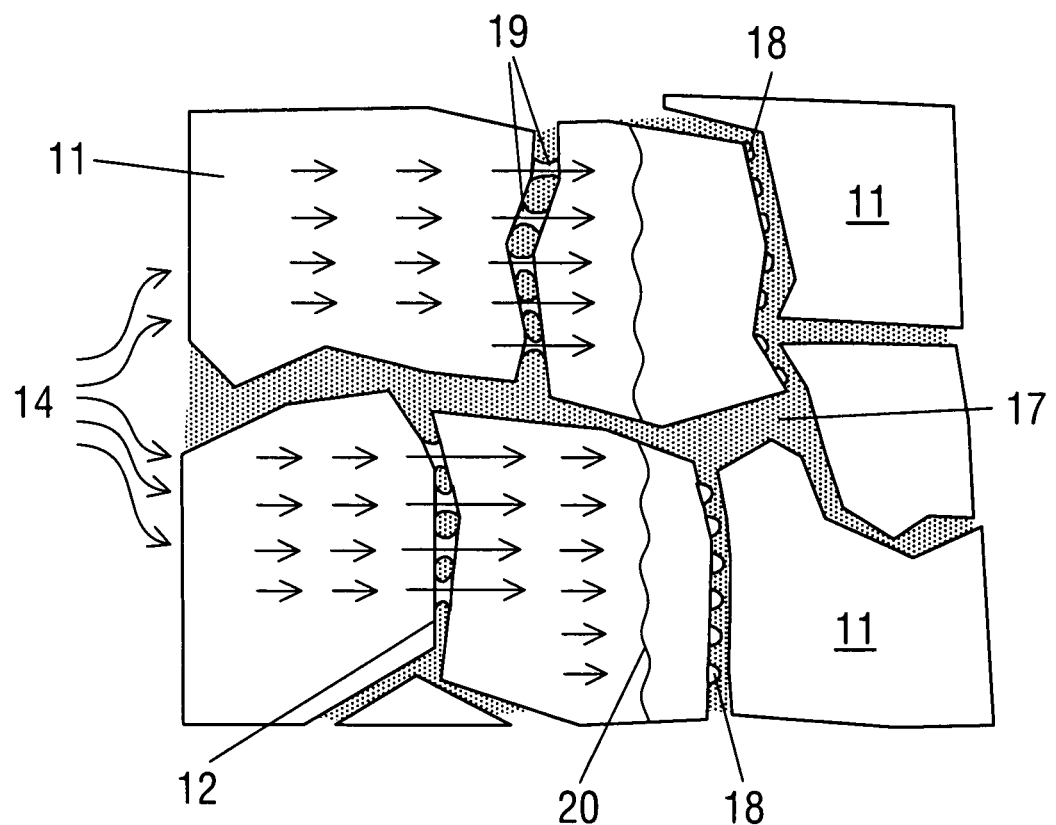
FIG. 3: the propagation of chase fluid in the fractured reservoir according to the third step of the method according to the invention.

In a third step, as shown in FIG. 3, a chase fluid 14 is injected into the reservoir 10. Due to the wettability properties of the blocks 11, and due to the fact that the fractures are plugged, the chase fluid 14 will enter into the blocks 11, possibly initiated by spontaneous imbibition, and preferably forced by pressure applied from the injection well. Consequently, the chase fluid will propagate through the blocks as indicated by arrows shown in FIG. 3. The length of the arrows shown in FIG. 3 is chosen for matters of clarity of the drawing and is not indicative of the value of pressure.

When a chase fluid 14 is injected into the reservoir and enters a block 11 either by spontaneous imbibition or by application of pressure, oil contained in the block will be displaced and driven out of the block towards the production wells. As the chase fluid 14 propagates in the block 11, water droplets 18 begin to form on the exit surface 12 and subsequently water phase bridges 19 are established spanning the fracture 13 between the exit surface 12 of the block and the adjacent block. The formation of water bridges is independent of the kind of chase fluid used for displacement since water is naturally present in the blocks. Thus, even if the chase fluid 14 is a gas, such as for example $CO_2$, water bridges 19 will form between adjacent blocks 11 crossing the fractures 13. When the wettability of the surfaces 12 are in the preferred range, water bridges 19 are established before the endpoint saturation for spontaneous brine imbibition is reached. Once water bridges 19 have been established between adjacent blocks 11, pressure applied on the chase fluid 14 can be transmitted across the fractures 13 via the water bridges 19. Thereby, capillary continuity can be maintained in the reservoir 10 and the propagating front 20 of chase fluid 14 can propagate in a continuous manner across the reservoir 10.

All aspects and features of the invention disclosed in the above description, the drawings, and the claims can be of significance both individually and in combination for the realization of the invention in its various embodiments.

The invention claimed is:

1. Method of recovering oil from a geological reservoir formation having a heterogeneous permeability distribution, comprising
   a plurality of permeable porous blocks whose pores contain oil and which form interfaces with regions between the blocks having a higher permeability than the blocks;
   the method comprising the steps of:
a) treating the interfaces by injecting a wettability altering agent into the reservoir such that a wettability of surfaces of the blocks is in a predetermined wettability range at the interfaces between the blocks and the regions of high permeability, wherein the wettability altering agent includes a combination of a first surfactant, which produces a stable foam in a seawater-based brine, a second surfactant, which changes the wettability of the surfaces of the blocks to make them moderately water-wet, and a third surfactant, which resists foam breaking when contacting oil,
b) reducing the permeability in the regions of higher permeability, and
c) flooding the reservoir by injecting a chase fluid into the reservoir for displacement recovery of oil, wherein
   the wettability range obtained with the treating step is such that during the flooding step a formation of water phase bridges in the regions between adjacent blocks is established or enhanced.

2. Method according to claim 1, wherein the wettability altering agent is a surfactant or a microemulsion.

3. Method according to claim 1, wherein the wettability altering agent is at least one of an amphoteric surfactant, alphaolefinsulfonate (AOS), an internal olefin sulfonate and anionic surfactant.

4. Method according to claim 1, wherein the wettability of the block surfaces is altered from strongly water-wet to moderately water-wet in the predetermined wettability range.

5. Method according to claim 1, wherein the wettability of the block surfaces is altered from oil-wet to moderately water-wet in the predetermined wettability range.

6. Method according to claim 1, wherein reducing the permeability in the regions of high permeability is achieved by injecting a permeability reducing agent into the reservoir.

7. Method according to claim 6, wherein the permeability reducing agent is at least one of a polymer, a gel, or sodium silicate.

8. Method according to claim 6, wherein the wettability altering agent is injected together with at least one of a foaming agent and the permeability reducing agent as the first step.

9. Method according to claim 1, wherein reducing the permeability in the regions of high permeability is achieved by injecting a foaming agent and a foaming gas into the reservoir, for generating foam in the regions having a high permeability.

10. Method according to claim 9, wherein the same gas is used as chase fluid and as foaming gas.

11. Method according to claim 9, wherein the foaming gas is at least one member selected from the group consisting of $CO_2$, nitrogen, and air.

12. Method according to claim 1, wherein reducing the permeability in the regions of high permeability is achieved by injecting a pregenerated foam made of a foaming agent and a foaming gas into the reservoir, for providing the foam in the regions having a high permeability.

13. Method according to claim 12, wherein the same gas is used as chase fluid and as foaming gas.

14. Method according to claim 1, wherein the chase fluid is at least one member selected from the group consisting of water, nitrogen-gas, $CO_2$-gas, and liquid $CO_2$.

15. Method according to claim 1, wherein the regions having a higher permeability than the blocks comprise fractures between the blocks.

16. Method according to claim 15, wherein a width of the fractures is less than 300 µm.

17. Method according to claim 1, wherein during the flooding step, the water phase bridges are established between the blocks due to the wettability of the block surfaces being in the predetermined range, thereby creating capillary continuity across the regions between the blocks for establishing conditions suitable for viscous displacement of oil by the chase fluid, wherein pressure continuity is created and transmitted for the chase fluid and thus fluid flow between the blocks is established.

18. Method for long time storage of $CO_2$ by using a method according to claim 1, wherein $CO_2$ is used as at least one of foaming gas and chase fluid.

* * * * *